Sept. 5, 1967
E. BAHNIUK
3,339,573
FLOW CONTROL VALVE
Filed March 15, 1965
3 Sheets-Sheet 1
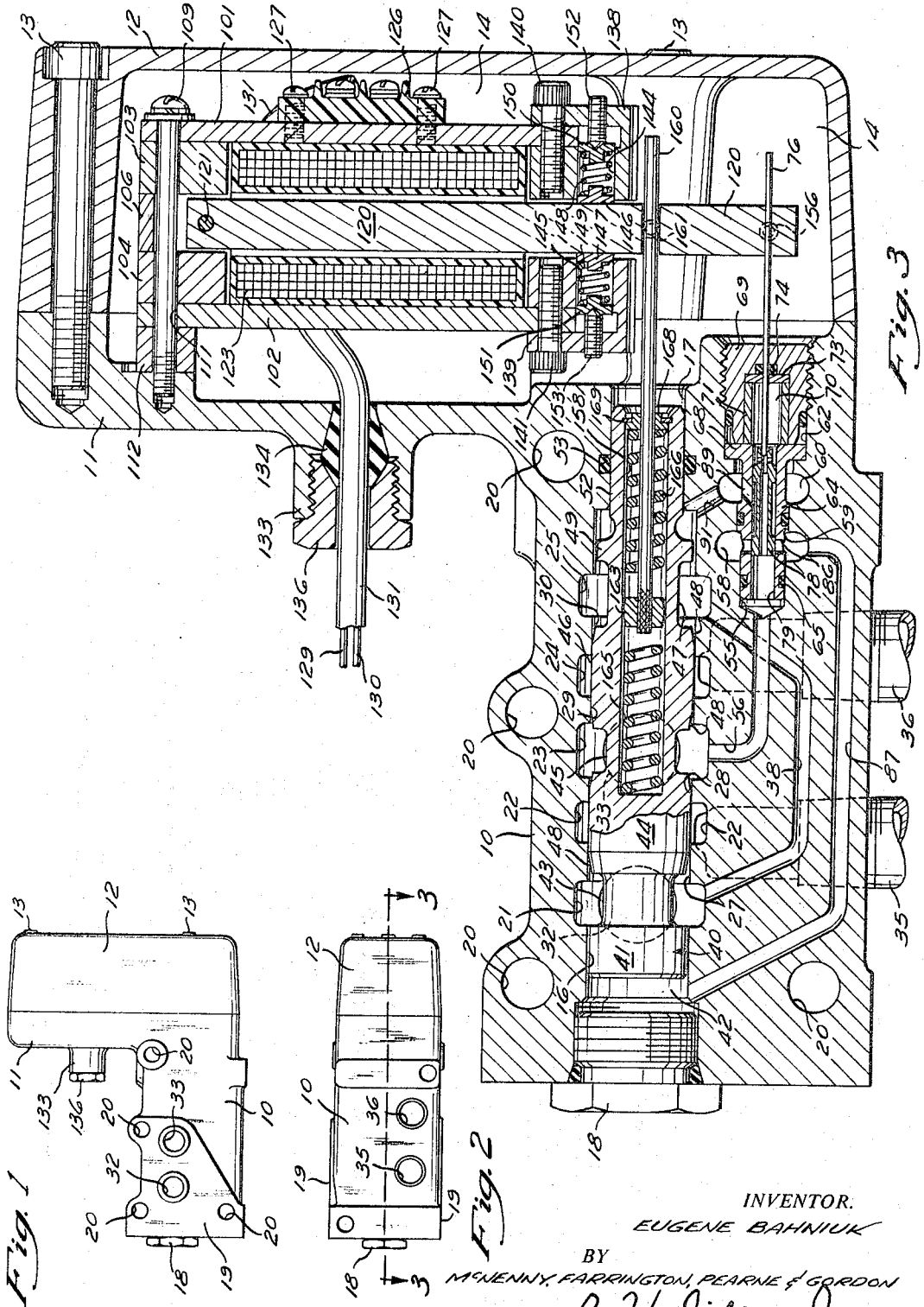
INVENTOR.
EUGENE BAHNIUK
BY
McNENNY, FARRINGTON, PEARNE & GORDON
ATTORNEYS Sept. 5, 1967    E. BAHNIUK    3,339,573
FLOW CONTROL VALVE
Filed March 15, 1965    3 Sheets-Sheet 2
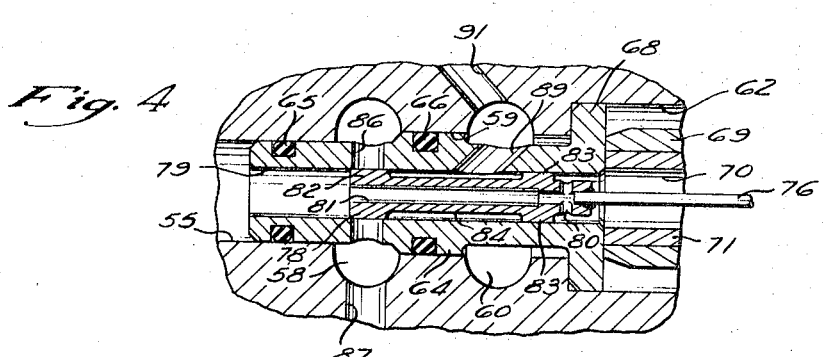
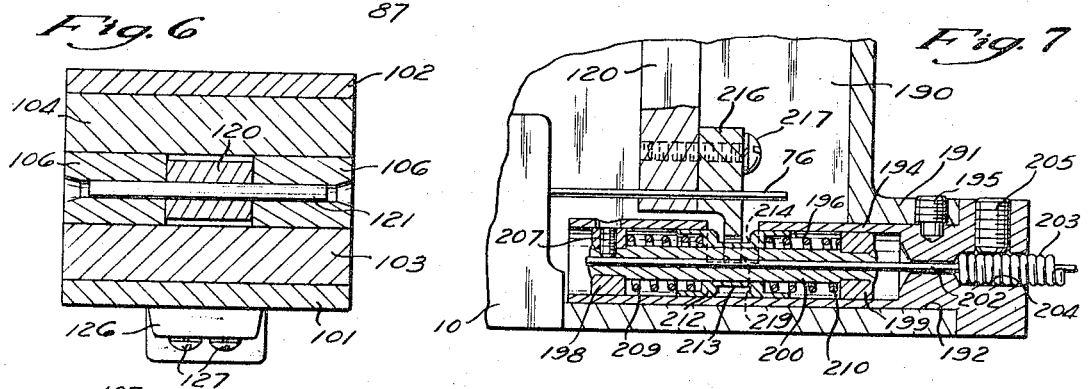
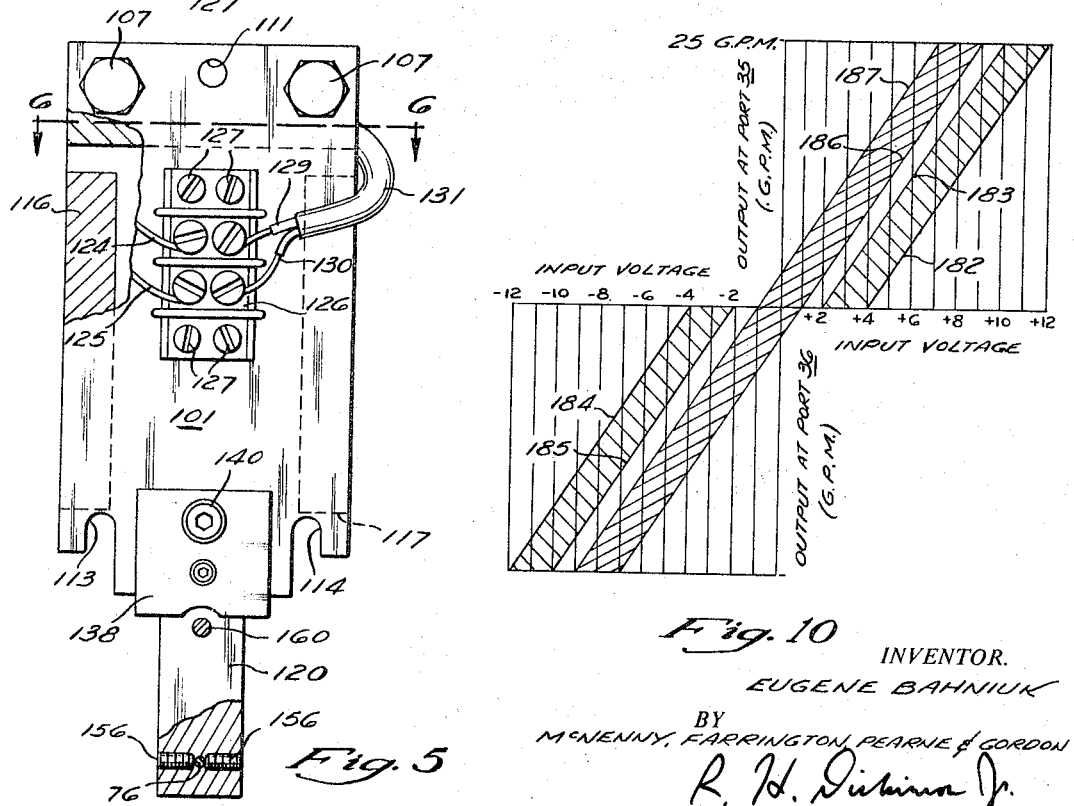
INVENTOR.
EUGENE BAHNIUK
BY
MCNENNY, FARRINGTON, PEARNE & GORDON
ATTORNEYS Sept. 5, 1967      E. BAHNIUK      3,339,573
FLOW CONTROL VALVE
Filed March 15, 1965      3 Sheets-Sheet 3
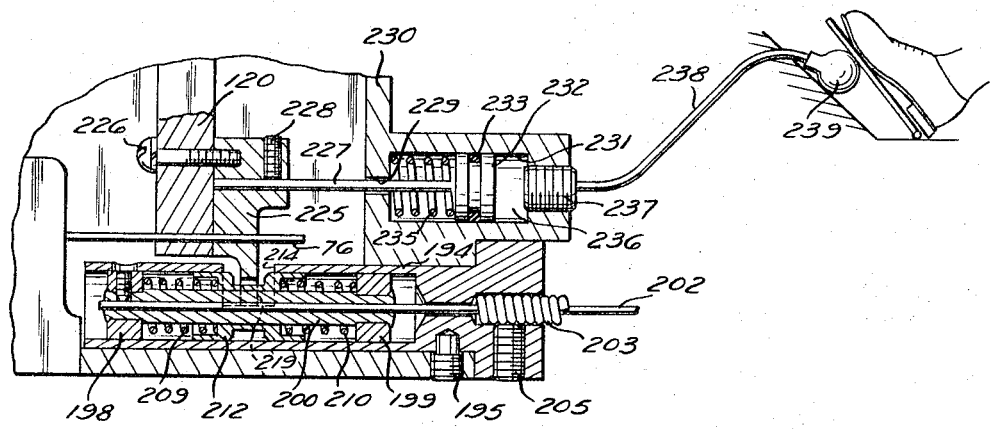
INVENTOR.
EUGENE BAHNIUK
BY
McNENNY, FARRINGTON, PEARNE & GORDON
ATTORNEYS

United States Patent Office 3,339,573
Patented Sept. 5, 1967

3,339,573
FLOW CONTROL VALVE
Eugene Bahniuk, Seven Hills, Ohio, assignor to The Weatherhead Company, Cleveland, Ohio, a corporation of Ohio
Filed Mar. 15, 1965, Ser. No. 439,895
14 Claims. (Cl. 137—85)

The present invention relates to a flow control valve and, more particularly, to a valve having output characteristics responsive to one or more of a plurality of input command signals. The input signal may originate from one or more of several sources. For instance, the signal may be electrically, hydraulically (including pneumatically), or mechanically imposed on the valve and, moreover, either singly or jointly.

A fluid flow controller or valve is often employed in the operation and control of various hydraulic equipment, such as a hydraulic cylinder, hydraulic motor, and the like. Such equipment, in turn, is commonly used in various earth moving machinery where it is highly desirable for an operator to be able to actuate such a valve without having its movements restricted. At present, many fluid control valves require the close physical presence of an operator which often makes it difficult for the operator to have a clear unobstructed view of the actual work being performed.

In the present control valve, one or more of the several sources, which serve to originate an input signal to the valve, may be located at points remote from the valve itself and as near as may be desired to the "load" equipment whose operation is at least partially to be controlled by the valve. This enables an operator to be located near a work station, such as a point where the load equipment is actually operating, and yet maintain control of a flow control valve by remote actuation.

It is, therefore, a principal object of the invention to provide a novel and improved flow control valve.

Another object of the invention is to provide a novel flow control valve whose output characteristics are responsive to the sign and magnitude of one or more of a plurality of input command signals, any one of which may be applied singly, or any two or more of which may be applied jointly.

Another object of the invention is to provide a novel flow control valve having reduced frictional drag and hysteresis loss during periods of change in volume and/or direction of fluid flow therethrough.

Another object of the invention is to provide a novel fluid control valve of the spool-operated type having means to stabilize the operation of the valve.

A further object of the invention is to provide a novel fluid control valve embodying torque motor means having an armature and containing adjusting means to regulate the spacing of air gaps about the armature.

A further object of the invention is to provide a novel flow control valve having torque motor means actuating a pilot valve for controlling the position of the main valve in which a direct force feedback measuring main valve position is applied to the torque motor means.

A still further object of the invention is to provide a novel flow control valve which achieves a high level of precision operation with wide tolerances and clearances in manufacture and which provides dependable operation in spite of dirt and contamination in the operating fluid.

Further objects and advantages of the present invention will be apparent from the following description and accompanying figures wherein:

FIGURES 1 and 2 are side elevational and bottom plan views, respectively, of the preferred embodiment of the present invention;

FIGURE 3 is a cross-sectional view taken on line 3—3 of FIGURE 2;

FIGURE 4 is an enlarged, fragmentary view of the pilot valve illustrated in FIGURE 3;

FIGURE 5 is a side elevational view, taken from the right hand side of FIGURE 3 of the torque motor;

FIGURE 6 is a cross-sectional view taken on line 6—6 of FIGURE 5;

FIGURE 7 is an enlarged, fragmentary view of a modified form of the present valve and illustrates mechanical means for impressing an input signal;

FIGURE 8 is an enlarged, fragmentary view, partly schematic, of a further modified form of the present valve and shows pneumatic means, optionally used in combination with mechanical means, for impressing an input signal;

FIGURE 9 is a diagrammatical illustration showing how the present valve may be connected with a pump to control operation of a hydraulic cylinder; and FIGURE 10 is a graphical illustration of the flow characteristics of the present valve with and without means for overcoming the effects of main spool overlap.

In general, the present valve embodies a movable flow-control main valve member which is actuated by a pilot valve. The displacement of the flow-control member is substantially proportional to an input signal to the pilot valve and is normally amplified with respect to the input signal. In the preferred form torque motor means displaces a movable flow-control member of the pilot valve and effects the main flow-control member of the valve. An armature of the torque motor means may also serve as an avenue through which to impress upon the pilot valve still other input signals of a non-electrical nature.

Referring now to the figures in greater detail, the illustrated embodiment of the invention includes a valve body 10 having at one end an upstanding portion 11 over which is fitted a cover plate 12, held in place by suitable means such as cap screws 13 to define therein a hollow chamber 14. The main portion of the valve body 10 contains the pilot and main valve members while the input signal means, including the torque motor are mounted within the chamber 14.

The main valve structure includes an elongated bore 16 within the valve body 10 having a reduced diameter portion 17 at the end adjacent the chamber 14. At the other end, bore 16 is sealed off by means of a suitable threaded plug 18. The bore 16 is interrupted at spaced points by a plurality of enlarged annular grooves 21, 22, 23, 24 and 25 which are connected to various ports and passages as will be described in greater detail hereinafter. The portions intermediate the grooves 21 through 25 define individual lands 27, 28, 29 and 30 having the diameter of bore 16.

The valve has an inlet port 32 which opens into the first groove 21 and a drain port 33 opening into the third groove 23. Both of the ports 32 and 33 extend from side to side through the valve because in many applications it is desirable that several valves be connected together for controlling different units in a common hydraulic system supplied by the same pump. To this end, the ports 32 and 33 open on flat parallel faces 19 of the valve body, and in turn the valve body provided with a plurality of transverse openings 20 for receiving bolts for securing together a plurality of valves.

A pair of control ports 35 and 36 open off the bottom surface of the valve (see FIGURE 2) and, in turn, open into the grooves 22 and 24, respectively. The valve body is provided with an internal passage 38 extending between groove 21 and groove 25, so that both of these grooves will be supplied with fluid at full line pressure at all times.

The main valve spool 40 is mounted within the bore 16 and in the neutral or zero flow condition, it is the position shown in FIGURE 3. In this position, the main valve spool 40 has an end land 41 adjacent the threaded plug 18 and spaced therefrom to provide a chamber 42 wherein fluid pressure can act to urge the valve spool in the direction toward the chamber 14. The valve spool 40 also includes an annular groove 43 adjacent the inlet groove 21 as well as a land 44 extending between bore lands 27 and 28 to thereby normally block off the first control groove 22. The valve spool has a second groove 45 which in the neutral position registers with the drain port groove 23, while a third land 46 extends between bore lands 29 and 30 to thereby normally cut off the second control groove 24. Beyond the bore groove 25, the spool has a reduced portion defining a third groove 47, adjacent which is an enlarged radial flange 49 having a diameter slightly less than that of bore 16 to provide a restriction to the flow of fluid between the flange 49 and the bore 16 to provide dampening for movement of the spool. Beyond the flange 49, spool 40 has a reduced portion 52 adapted to fit within the reduced bore portion 17 with which it makes sealing contact by means of an O-ring seal 53 to prevent leakage of fluid into the chamber 14.

The operation and position of the main valve spool 40 is controlled by a pilot valve located in the valve body 10 generally below and parallel to the main valve. The pilot valve includes a bore 55 in the valve body 10 which at its end away from chamber 14 is connected by a passage 56 to the third or drain groove 23 of the main valve bore. Moving in the direction toward the chamber 14, the bore 55 opens into an enlarged annular groove 58 outwardly of which is an enlarged bore 59 having a diameter slightly greater than that of bore 55. In turn, outwardly of the bore 59 is a second groove 60 and at the outer end is an enlarged counterbore 62 opening into the chamber 14.

A valve sleeve 64 is fitted within the bores 55 and 59 with which it makes sealing contact by means of O-ring seals 65 and 66. The valve sleeve 64 at its outer end has a radial flange 68 which is adapted to fit against the bottom of the counterbore 62 to position the valve sleeve axially within the valve body 10. The counterbore 62 is closed off and the valve sleeve 64 held in place by means of a plug 69 threadedly secured in the counterbore 62. Within the threaded plug 69 is a hollow chamber 70 to allow movement of the pilot valve, and within the chamber 70 is a tubular sleeve 71 which cooperates with a washer 73 to hold in place an O-ring 74 to seal against leakage around the rod 76 which extends through an aperture in the plug 69 between the plug chamber 70 and the chamber 14 within which the torque motor is mounted.

At its inner end, the rod 76 is secured to a pilot valve spool 78 which is slidably mounted within a bore 79 in the pilot valve sleeve 64. The bore 79 communicates at one end with the hollow chamber 70 and at the other end with passage 56. Communication between the two ends of bore 79 is provided at all times by a passage 81 within the pilot valve spool 78 which extends from end to end through the passage and by means of transverse openings 80 communicates with the chamber 70. At each end, the pilot valve spool 78 has a pair of lands 82 and 83 which make sealing contact with the bore 79, and between these lands is an elongated annular groove 84. The pilot valve sleeve further includes transverse ports 86 adjacent the end land 82 which open into the first groove 58 which in turn communicates by a passage 87 with the chamber 42 adjacent the end of the main valve spool. Another port 89 in the valve sleeve 64 connects the pilot valve spool groove 84 to the second groove 60, which in turn is connected by another passage 91 with the end of the main valve spool bore 16 adjacent the damping flange 49.

The torque motor for operating the pilot valve is mounted within the chamber 14 as shown in FIGURE 3, and the construction of the torque motor is shown in greater detail in FIGURES 5 and 6. The torque motor assembly includes a pair of outer side plates 101 and 102 which at their upper end are separated by a pair of spacer blocks 103 and 104 which in turn are separated by a pivot block 106. All of these members are held together by means of cap screws 107 (see FIGURE 5) which threadedly engage suitable nuts (not shown) adjacent the side plate 102. The torque motor assembly is held in place within the housing by suitable screw means including a single screw 109 (see FIGURE 3) which passes through a bore 111 extending through the side plates 101 and 102, the spacer blocks 103, and 104, and the pivot block 106. The side plate 102 is spaced away from the upstanding portion 11 which the screw 109 is threadedly engaged by a spacer 112 which provides for clearance for the nuts on the cap screws 107. At the lower end, the entire torque motor assembly is held in place by screws similar to 109 but engaging the two slots 113 and 114 in the side plates 101 and 102. On their sides, the side plates 101 and 102 are spaced apart by a pair of permanent magnets 116 and 117 (see FIGURE 5) which are magnetically polarized along their edges adjacent the side plates, the magnets of course being polarized in the same direction so that the side plates 101 and 102 will be of opposite polarity.

The output member of this torque motor assembly is an elongated armature 120 which is pivotally mounted at its upper end on a pivot pin 121 carried by the pivot block 106. It will be appreciated that the pivot block 106 is generally in the shape of an inverted U having clearance in the center as shown in FIGURE 3 to receive the armature and extending downward on each side to receive the pivot pin 121 and position the armature against lateral movement along the axis of the pivot pin. Thus, the armature 120 is suspended to pivot about the pin 121 and move toward either of the side plates 101 and 102. A coil 123 is positioned around the armature 120 below the spacer blocks 103 and 104 and within the space defined by the side plates 101 and 102 and the permanent magnets 116 and 117. The coil 123 is wound generally as a solenoid type coil so that depending upon the direction of current flow in the coil the magnetic field produced by the coil will extend lengthwise along the armature 120 to make this in effect a bar-type electromagnet.

The electrical connections for the coil 123 are made by a pair of leads 124 and 125 which exend from the coil out to terminals on a terminal block 126 secured on the outer side of side plate 101 by suitable means such as screws 127. Connection is made from the terminals on terminal block 126 by a pair of lines 129 and 130 which are formed with an insulating covering into a cable 131. To provide a suitable sealed entrance for the cable 131 into the housing, a projecting boss 133 is formed on the upstanding portion 11 and is constructed and arranged to receive a rubber bushing 134 which is pressed into a part placed under compression to make sealing contact with the wall and the cable 131 by a suitable compression nut 136.

In order to concentrate the magnetic field produced by the permanent magnets 116 and 117 on the armature 120, pole pieces are provided at the lower ends of the side plates 101 and 102. It should be noted that balance of the flux path of the magnetic field requires an air gap at the upper end as well as at the lower end of the armature, but since the air gap at the upper end is adjacent the pivot pin 121, it acts on only a very short lever arm and produces substantially no effect upon the movement of the armature 120. The pole pieces at the lower end consist of a pair of generally U shaped pole blocks 138 and 139 adapted to fit over the side plates 101 and 102, respectively, and are held in place by suitable cap screws 140 and 141. These pole blocks 138 and 139 are arranged so that when secured in place on the side plates 101 and 102 they define between them a gap between .040 and .065 inch greater than the width of the armature 120 at this point so as to allow a total range of movement of the armature of this amount.

In order to maintain the armature 120 centered in the gap between the pole blocks 138 and 139, as well as to provide the necessary spring resistance to movement of the armature, a spring biasing force is applied in both directions to the armature 120. To do this, each of the pole blocks 138 and 139 is provided with a transverse bore on the inner portion below the cap screws 140 and 141. Within these bores 144 and 145, are fitted, respectively, plungers 146 and 147 which bear against the adjacent sides of the armature 120. Backing up the plungers 146 and 147 are a pair of identical coil springs 148 and 149 which at their outer ends abut against a pair of outer plungers 150 and 151. The outer plungers 150 and 151 are adjustably positioned by means of adjusting screws 152 and 153 which are threadedly engaged in respective pole blocks 138 and 139. Thus, by turning the adjusting screws 152 and 153, the biasing force of the adjacent coil springs can be varied so that the biasing forces will be balanced when the armature is centered in the gap between the pole blocks. Likewise, by turning both adjusting screws the same amount, the amount of the spring preload and biasing force can be adjusted.

From the foregoing structure, it can be seen that the torque motor is arranged so that the pole blocks 138 and 139 are normally magnetized with opposite polarities. Thus, whenever an electric current is sent through the coil 123, the armature 120 becomes polarized with the lower end having either a north or south pole, depending upon the direction of the current in coil 123. Under these circumstances, the polarization of the armature 120 by the coil 123 will cause the armature then to be repelled by the like pole of the pole blocks 138 and 139 and attracted by the unlike pole so as to tend to move the armature in the direction of the unlike pole against the resistance of the adjacent spring. Since the attraction and magnetic force applied to the armature 120 will be proportional to the amount of current in the coil 123, the coil operating below the saturation limit, and since the springs have a rate so that it requires increasing force to compress these increasing distances, it will be seen that the actual movement of the armature 120 can therefore be made to vary in a substantially linear manner with the amount of current supplied to the coil 123.

To connect the torque motor to the pilot valve, the pilot valve rod 76 is received in the lower end of the armature 120 where it is secured in place by suitable means such as set screws 156. Thus, movement of the armature 120 applied to the rod 76 will cause the pilot valve spool 78 to move back and forth within the bore 79.

To provide a feedback linkage between the main valve and the torque motor, the valve spool 40 is provided with a blind bore 158 open at the end adjacent the reduced portion 52. Within this bore 158 is positioned a rod 160 whose other end is secured in an opening in the armature 120 by suitable means such as set screws 161. The rod 160 terminates at the mid point of the bore 158 where it carries rigidly secured to it a button 163. A pair of coil springs 165 and 166 are positioned within the bore with 158, one on each side of the button 163. Thus, spring 165 is arranged to abut at one end on end of the blind bore 158 and at the other end on the button 163, while the other spring 166 abuts at the one end on button 163 and at the outer end on an apertured plug 168 secured in place at the outer end of the bore 158 by suitable means such as snap ring 169. Preferably, the springs 165 and 166 are arranged to have a free length somewhat less than the spacing between their respective abutments when the valve is in the neutral position so as to provide a lost motion requiring the main spool 40 to move a certain distance in either direction from the center or neutral position before one of the springs becomes compressed.

In the operation of the valve, the input signal is applied to the armature 120 by means of the electric coil 123. The movement of the armature 120 is then applied through the rod 76 to the pilot valve spool 78 to shift the position of the end land 82 with respect to the transverse port 86. It will be noted that since the body bore groove 23 is connected directly to the drain port 33, then because of the connection through the connecting passage 56, the side of land 82 adjacent passage 56 is always at low or drain pressure. Likewise, because of the connection through inlet port 32, the groove 21 is always at full supply pressure which in turn is connected through the passage 38 to the groove 25. This supply pressure is then communicated past the flange 49 to the passage 91 and then to groove 60. This groove is in turn connected through port 89 to the pilot valve spool groove 84 so that the other side of end land 82 is thus at substantially full supply pressure.

The pilot valve spool land 82 has an axial length slightly greater than that of the transverse port 86 so that when the land is centered in the port, the port is blocked off from communication with both drain and supply pressure. Since the port 86 is blocked off, and this port communicates through groove 58 and passage 87 with the end in this chamber will remain constant and the valve spool chamber 42 for the main valve spool, the amount of fluid held in position. Since the other end of the main valve spool at 52 is reduced to have approximately half the area of the end exposed in the chamber 42, the valve spool will then be balanced with a static pressure within the chamber 42 equal to substantially half of the line pressure. However, when the pilot valve is moved toward the right as seen in FIGURE 3, the end land 82 will move so as to uncover the transverse port 86 and thereby through the aforementioned passages connect the chamber 42 to drain. When this is done, the supply pressure acting on the other end of the main valve spool shifts the main valve spool to the left.

It will be seen that movement of the main valve spool 40 to the left as seen in FIGURE 3 will cause the second land 44 to shift in a direction wherein the adjacent groove 45 comes into alignment with the body land 28 to allow communication between the adjacent bore grooves 22 and 23. This serves to connect the control port 35 to drain. When the valve spool 40 is in this position, movement of the other land 46 allows the groove 47 to move into alignment with the body land 30 so as to provide communication between grooves 24 and 25. Since the groove 25 is connected to full supply pressure by the passage 38, this will allow the supply pressure from the inlet 32 to flow directly to the other control port 36. By virtue of the beveled portions 48 on the wide lands 44 and 46, the movement of the main valve spool 40 allows smooth throttling of the fluid flow and therefore the neutral positioning of the main valve spool 40 is not extremely critical and it is possible that the body bore grooves 21 through 25 may be formed by coring into the casting rather than by machining. Of course, it will be understood that the valve spool 40 is positioned at a variety of positions so that the rate of flow to and from the control ports 35 and 36 may be carefully regulated.

In like manner, if the pilot valve spool 78 were moved toward the left as seen in FIGURE 3, then the supply pressure in the groove 25 will be communicated through the passage 91 to the groove 60, and from there through the port 89 to the annular groove 84 on the pilot valve spool. When the land 82 is moved to the left, the fluid may then flow from the groove 84 through the transverse port 86 to groove 58 and then through passage 87 to the chamber 42. Since chamber 42 is now pressurized at full supply pressure and has substantially twice the area of the effective area on the other end of the valve spool also subjected to supply pressure, the main valve spool 40 will be moved to the right. In this position, the reverse operation takes place in that the inlet 32 is connected to the first control port 35 through the groove 43, while groove 45 serves to connect the upper control port 36 to the drain port 33. Because of the presence of the flange 49 on the main valve spool creating a rather small clearance with the bore 16 the movement of the spool 40 is dampened so as to prevent overshoot or hunting on the part of the valve so that it may move in a controlled manner to a new position.

It will be understood that when the main valve spool 40 is moved to either one of the side positions, the return of the pilot valve spool 78 to the neutral position would cause the end land 82 to again block off the transverse port 86 and thus seal off the chamber 42 so as to prevent the flow of fluid either to or from this chamber and thereby hold the main valve spool 40 locked in the selected position.

Since the pilot valve spool 78 is moved by means of the rod 76 and the torque motor armature 120, a supply of current to the coil 123 of one polarity will cause the armature 120 to move to the left. This will cause the pilot valve spool and main valve spool to cooperate in the aforesaid manner to connect the first control port 35 to supply pressure in the other control port 36 to drain. Likewise, a supply of current of opposite polarity to the coil 123 will cause the armature 120 to move to the right as seen in FIGURE 3 and thereby connect control port 35 to drain and the other control port 36 to supply pressure.

The foregoing valve structure however requires a feedback loop to interconnect the actual position of the main valve spool 40 to the command position determined by the forces applied to the torque motor armature 120. This feedback is accomplished by means of the rod 160 which provides a biasing force on the armature 120 proportional to the displacement of the main valve spool 40 from the center position. For example, if the valve spool 40 is moved to the left as seen in FIGURE 3, the apertured plug 168 will force the coil spring 166 against the button 163, so that after any lost motion is taken up, further movement of the main valve spool 40 toward the left will provide an increasing biasing force tending to shift the armature 120 toward the left. Since in accordance with the previous description of the operation of the valve, this movement of the main valve spool to the left is accomplished by movement of the pilot valve spool to the right, as caused by movement of the lower end of the armature 120 to the right, the feedback force through the rod 160 will be in a counterbalancing direction tending to shift the armature 120 and hence the pilot valve spool back to the center position. Since the input to the armature 120 was in the form of a force or torque tending to move the armature toward the right, this position will be maintained only until the main valve spool 40 has moved toward the left a sufficient distance to provide a counteracting force on the armature 120 necessary to move it back to the center position. Since this feedback force through the rod 160 is proportional to the displacement of the main valve spool 40, and since the input signal can be a variable force applied to the armature 120, it can be seen that there is a linear relationship between them, and the greater the force applied to the armature 120, the farther the valve spool 40 will move to return the system to equilibrium and therefore the greater the flow will be from the supply port to the selected control port 36. Thus, the valve serves as a stable proportioning valve adapted to precisely control the rate and direction of fluid flow to and from one or the other of a set of control ports.

A typical circuit utilizing the control valve is shown for illustration purposes in FIGURE 9. This shows a system in which hydraulic fluid is supplied from a reservoir 171 by a pump 172 through conduit 173 to the inlet port 32 of the valve body 10. The drain is provided from the drain port 33 back through drain line 179 to the reservoir 171. The valve spool 40 controls the fluid flow to one or the other of the two supply lines 174 and 175 connected to the control ports 35 and 36, respectively. As shown, the lines 174 and 175 are connected to a hydraulic cylinder 176 on each side of the piston 177 connected by suitable means such as piston rod 178 to the object to be moved. In accordance with the foregoing discussion, it will be seen that as fluid is directed from the supply to one of the control ports 35 and 36, the other is connected to drain so as to determine movement of the piston 177 in one direction. By controlling the flow of high pressure fluid to the high pressure side of the piston 177, the rate of movement of the piston 177 may be carefully controlled. Likewise, by shifting the main valve spool 40 in the opposite direction, the flow of fluid is reversed so as to cause the piston 177 to move at a controlled rate of speed in the opposite direction. Thus, the control valve of this invention operates as a four-way valve to control the direction of fluid flow and as a precise remote control throttling valve so as to control the rate of fluid flow to and from the unit to be controlled.

These control characteristics of the valve are illustrated in the drawing of FIGURE 10. This drawing is a plot of the output flow at each of the control ports connected to supply pressure in relationship to the input voltage applied to the coil 123. As shown, when a positive input voltage supplied to the coil, the output at control port 35, assuming the valve starts operation at zero flow, will initially start at four volts and follow the line indicated at 182 to provide an increasing flow with increasing voltage. The area to the left of the line 182 between that line and the line 183 represents a hysteresis in that when the valve is regulated for a high flow condition, it is necessary to reduce the applied voltage at a given rate of flow to the level indicated by line 183 before the flow is reduced. Likewise, if the polarity is reversed, under increasing negative voltage the characteristic will follow the line 184 and under the decreasing negative voltage will return along line 185. It will be noticed that if it is desired to reverse the flow through the ports, assuming the flow is out through port 35, the output flow will drop to zero when the input voltage has dropped to a positive two volts. However, it is necessary to change polarity and then go to a minus four volts before any flow begins at the other control port 36. This represents a dead zone of six volts total in reversing flow and is generally desirable to provide feel for the operator. This dead zone results from the overlap of the grooves and lands on the main valve spool and bore together with an absence of lost motion of springs 165 and 166, since in such a case the springs would apply a feedback force before any flow started. If the lost motion before either of the springs 165 and 166 is compressed is increased until the valve spool 40 moves to a point to start flow, then the valve would have the characteristics indicated by the shaded portion between the lines 186 and 187. However, such a structure would tend to be unstable near the zero voltage condition and it would be difficult to cut the flow down to zero since it would be necessary when operating with a positive voltage to change the polarity and apply a negative voltage in order to reduce the flow to zero, and such negative voltage would have to be precisely controlled to avoid a reversal of flow through the other control port. Thus, the proper selection of the lost motion for springs 165 and 166 determines the width of the dead zone between the control curves in the two directions of flow.

The width between the adjacent lines as between 182 and 183 which results in a hysteresis effect occurs because in order to insure stable operation the land 82 on the pilot valve spool is slightly wider than the transverse port 86 to insure positive sealing of the port for stable operation. Thus, this width under a reduction or increase of flow condition requires additional movement of the pilot valve a distance of this overlap, and such movement represents a change in the torque applied by the armature 120.

The slope of the lines 182–187 is controlled by the rate of the springs 148 and 149 and the use of lighter springs requires a smaller amount of torque to shift the pilot valve.

Because the operation of the valve is determined by the position of and forces applied to the armature 120, this construction readily lends itself to allow additional or alternate actuation of the valve by means of other ways to apply a signal to the armature 120 instead of or in addition to the coil 123. For example, a manual remote control may be used to apply a varying bias on the armature 120, and such construction is shown by way of example in FIGURE 7. The valve body 10 is fitted with a modified cover plate 190 having at its lower end a projecting boss 191 having an axial bore 192 therein. Within the bore 192 is fitted an insert 194 retained in place by means of a set screw 195. The insert 194 has a tubular bore 196 within which are slidably mounted a pair of pistons 198 and 199 which are spaced apart by and rigidly secured to a rod 200. The rod 200 in turn has a bore to receive one end of a control wire 202 which may be of the Bowden cable type, in which case the outer sheath 203 is secured in a counterbore 204 in the end of insert 194 by suitable means such as set screw 205. The control wire 202 may be secured within the rod 200 by suitable means such as set screw 207. Between the two pistons 198 and 199 are a pair of helical springs 209 and 210 each of which has one end abutting against one of the pistons 198 and 199 and their other ends separated by a spacer 212 slidably mounted on the rod 200. The spacer 212 has a reduced diameter portion 213 which registers in alignment with a transverse slot 214 cut in the insert 194. A finger 216 is mounted on the lower end of the armature 120 by suitable means such as screw 217 and has a pair of forked ends 219 which fit around the reduced portion 213 of the spring spacer 212.

Thus, it can be seen that when movement is imparted to the control wire 202, the assembly of the pistons 198 and 199 and rod 200 will slide within the insert bore 196 to a selected position. Since the spring spacer 212 is biased by the springs 209 and 210, it can be arranged to apply a variable spring bias to the finger 216 and hence armature 120. It will be noted that the reduced portion 213 has an axial length considerably greater than the length of the forked portion 219 so that when the spacer is in the central position, the armature may move through the full range of movements in both directions without contacting the spacer so as not to interfere with the electrical actuation of the valve.

A further method of applying a signal to the armature 120 is shown in FIGURE 8 and additionally includes a hydraulic or pneumatic override. As shown therein, a modified finger 225 is secured to the armature 120 by suitable means such as screw 226 and has a bore therein to receive one end of a piston rod 227 secured in place by suitable means such as set screw 228. The other end of the piston rod 227 extends through an aperture 229 in a modified coverplate 230 which is otherwise similar to the coverplate 190 of the embodiment of FIGURE 7. The coverplate 230 has therein an axial bore 231 in which is slidably journaled a piston 232 rigidly secured to the other end of rod 227. Sealing means are provided as by O-ring seal 233 to insure that the piston 232 makes sealing contact with the bore 231. In the embodiment shown, the piston 232 is normally biased away from the armature 120 by spring means such as helical spring 235. The biasing force of the spring 235 may be overcome by means of introducing fluid pressure to the other side of the piston 232. This can be done by connecting the chamber 236 on the other side of piston 232 through a suitable fitting 237 and line 238 to a source of fluid pressure which may be a closed bulb indicated at 239. Thus, either by foot or by hand the bulb 239 can be squeezed so as to force fluid into the chamber 236 to thereby shift the piston 232 and rod 227 so as to urge the armature 120 to the left as seen in FIGURE 8. Such an arrangement can be utilized either to move the armature 120 in one direction from zero, or to move it in one direction from the extreme full flow in the opposite position so that a moderate pressure is required to reduce the valve to zero output flow through both control ports. Alternatively, a similar arrangement may be provided to shift the armature 120 in the opposite direction.

It will therefore be seen that the valve operates as a four-way throttling type flow control valve of the pilot actuated type which requires only a small force to be applied to the pilot valve to actuate the main valve. The main valve in turn applies a force feedback to the armature which operates the pilot valve so as to stabilize the operation of the valve. The arrangement of the armature is such as to allow a plurality of forces to be applied to the armature so that a plurality of signal input means can be used to control the valve.

Although several embodiments of the invention have been shown in the drawings and described in detail in the preceding description, it is recognized that upon a full comprehension of the present invention various modifications and rearrangements will readily occur to those skilled in the art and may be resorted to without departing from the scope of the invention as defined in the following claims.

What is claimed is:

1. A fluid-operated flow control valve having an output flow whose direction and magnitude are responsive to one or more of a plurality of input signals, said valve comprising a valve body having an internal bore provided with an inlet port adapted to receive a fluid under pressure, a drain port, and a pair of cooperating ports through each of which a fluid may reversibly flow, a spool member adapted for reversible axial movement in the chamber, said spool having a plurality of axially spaced annular lands and grooves adapted upon axial movement of the spool member to selectively connect said inlet port to one of said cooperating ports and the other of said cooperating ports to said drain port, a pilot valve spool carried by the valve body operable to position said spool member in the chamber, an arm member movably supported with respect to the valve body for movement responsive to at least one of a plurality of input signals, first connecting means between said arm member and said pilot valve spool, second connecting means having a lost-motion action interconnecting said arm member and said spool member, whereby movement of said arm member in response to an input signal moves said pilot valve spool to determine a movement of said spool member producing a force tending to shift said arm member in opposition to said input signal.

2. A hydraulic flow control valve having an outlet flow whose direction and magnitude are responsive to the magnitude and polarity of an electrical input, said valve comprising a valve body having an internal bore, a main valve spool carried within said bore for axial movement, said main spool having a plurality of axially spaced annular lands and grooves, said valve body having an inlet port, a drain port, and load ports adapted to be connected to a hydraulic load to be operated by said valve, all of said ports communicating with said bore, said inlet port being adapted to receive a hydraulic fluid at pressure, passage means to conduct said fluid to fluid chambers adjacent each of the ends of said bore, a three-way pilot valve having a pilot valve spool and being interposed between one of said fluid chambers and the drain port and thereby effective to conduct said fluid to such drain port, said pilot valve also having means to conduct fluid pressure from said inlet port to said one fluid chamber, the axial movement of said main valve spool being operable to selectively connect said inlet port to one of said load ports and the other of said load ports to the drain port, torque motor means having a movable armature supported with respect to the valve body, first connecting means connecting said armature to said pilot valve spool, second connecting means having a lost-motion action connecting said armature to said main valve spool, and means to apply an electrical signal to said torque motor means, whereby resultant displacement of said armature from a neutral position initiates through said pilot valve a responsive axial movement of said main valve spool tending to restore said armature to the neutral position.

3. A hydraulic proportional flow control having an output flow whose direction and magnitude are responsive to one or more of a plurality of input signals, said valve comprising a valve body having an internal bore, a main valve spool carried within said bore for axial movement, said main spool having a plurality of axially spaced annular lands and grooves, said valve body having an inlet port, a drain port, and load ports adapted to be connected to a hydraulic load to be operated by said valve, all of said ports communicating with said internal bore, said inlet port being adapted to receive a hydraulic fluid at substantially constant pressure and to conduct said fluid to fluid chambers adjacent each of the ends of said bore, a three-way pilot valve having a spool and being interposed between one of said fluid chambers and the drain port and operable to conduct fluid to said drain port, said pilot valve also having means operable to supply fluid pressure to said one fluid chamber, the axial movement of said main spool being operable to selectively connect at one time said inlet port to one of said load ports and another of said load ports to the drain port, torque motor means having a pivoted armature supported with respect to the valve body, first connecting means directly connecting said armature to said pilot valve spool, second connecting means having a lost-motion action connecting said armature to said main valve spool, electrical actuating means to impress an electrical signal upon the torque motor means, and non-electrical actuating means connected to said armature, whereby displacement of the armature from a neutral position of zero torque by a net torque exerted on the armature by one or more of said actuating means initiates through movement of said pilot valve spool a responsive movement of said main valve spool restoring the armature to a neutral position, thereby affecting the direction and magnitude of flow through said load ports.

4. The flow control valve of claim 3 wherein said non-electrical actuating means includes a mechanical actuator operatively connected to the armature and leading externally of the valve body to a station of use.

5. The flow control valve of claim 3 wherein said non-electrical actuating means includes a piston member mounted for reciprocation, connecting means joining the piston member to the armature, and wire means to effect reciprocation of the piston and thereby displacement of the armature.

6. The flow control valve of claim 3 wherein said non-electrical actuating means includes a fluid-actuated means operatively connected to the armature and leading externally of the valve body to a station of use.

7. The flow control valve of claim 3 wherein said non-electrical actuating means includes a piston member mounted for reciprocation, connecting means joining the piston member to the armature, and pneumatic means to effect reciprocation of the piston and thereby displacement of the armature.

8. The flow control valve of claim 3 wherein said inlet port communicates with said internal bore adjacent said other fluid chamber.

9. The flow control valve of claim 3 wherein said second connecting means is a rod fixed adjacent one end to the armature and resiliently carried adjacent the other end with respect to the main valve spool to provide the lost-motion action.

10. The flow control valve of claim 3 wherein said main valve spool has a cavity, said second connecting means is a rod fixed adjacent one end to the armature and telescopically disposed within the cavity, and spring means resiliently opposing relative axial movement between said main valve spool and said rod to provide the lost-motion action.

11. The flow control valve of claim 3 wherein said main valve spool has a longitudinally extending cavity, said second connecting means is a rod fixed adjacent one end to the armature and telescopically disposed within the spool cavity, an abutment member on a portion of the rod within the cavity, and resilient means positioned within said cavity and on each side of the abutment member.

12. The flow control valve of claim 11 wherein said resilient means and abutment member are spaced axially of the spool to provide relative movement therebetween prior to making physical contact, thereby to reduce hysteresis loss upon fluctuation of flow through said load ports.

13. The flow control valve of claim 3 wherein said main valve spool has a radial projecting dampening flange effective to stabilize operation of the valve.

14. The flow control valve of claim 3 wherein said torque motor means includes a housing, an electrical coil within the housing adapted to receive an electrical signal and magnitize said armature, said housing having a pair of pole pieces adjacent one end of said armature, one on each side of said armature and spaced therefrom forming air gaps, and spring means carried with respect to the housing to regulate the spacing of the air gaps between said armature and said pole pieces.

References Cited
UNITED STATES PATENTS

| 2,591,800 | 4/1952 | Gardiner | 137—625.64 X |
| 2,624,585 | 1/1953 | Churchill et al. | 137—625.64 X |
| 2,775,982 | 1/1957 | Canfield | 137—625.64 |
| 2,790,427 | 4/1957 | Carson | 137—85 X |
| 2,953,123 | 9/1960 | Reen et al. | 137—625.64 X |
| 2,970,575 | 2/1961 | Stern | 137—625.64 X |
| 2,996,045 | 8/1961 | Burton | 137—625.64 X |
| 3,055,383 | 9/1962 | Paine | 137—85 |

OTHER REFERENCES

Kinney et al.: February 1959, "What You Can Get in Electrohydraulic Servo Valves," Applied Hydraulics and Pneumatics, p. 69.

M. CARY NELSON, *Primary Examiner.*

R. J. MILLER, *Assistant Examiner.*